United States Patent [19]
Williams, III et al.

[11] Patent Number: 4,682,917
[45] Date of Patent: Jul. 28, 1987

[54] SPADE BIT WITH FLUTED SHOULDERS

[75] Inventors: A. Graves Williams, III, Wilmington; Ronald L. Thackston, Hillsboro, both of Ohio

[73] Assignee: The Irwin Company, Wilmington, Ohio

[21] Appl. No.: 822,234

[22] Filed: Jan. 24, 1986

[51] Int. Cl.$^{4}$ .............................................. B23B 51/00
[52] U.S. Cl. .................................... 408/212; 408/225; 408/229
[58] Field of Search ............... 408/189, 196, 199, 211, 408/212, 213, 214, 223, 224, 225, 227, 228, 229; 407/57

[56] References Cited

U.S. PATENT DOCUMENTS

| | | | |
|---|---|---|---|
| 2,600,286 | 6/1952 | Weiland . | |
| 2,613,710 | 10/1952 | Emmons . | |
| 2,627,292 | 2/1953 | Kronwall . | |
| 2,782,824 | 2/1957 | Robinson | 408/214 |
| 3,920,350 | 11/1975 | Southall et al. | 408/211 |
| 3,966,350 | 6/1976 | Benjamin | 408/211 |
| 4,120,601 | 10/1978 | Benjamin | 408/223 |

*Primary Examiner*—Z. R. Bilinsky
*Attorney, Agent, or Firm*—Wood, Herron & Evans

[57] ABSTRACT

The cutting rate of a spade bit is greatly improved by the provision of radial flutes on the lateral shoulders of the bit, extending transversely to the bit axis. Further improvements are obtained if the shoulder flutes are stopped by spurs positioned at the outer ends of the shoulders.

10 Claims, 4 Drawing Figures

SPADE BIT WITH FLUTED SHOULDERS

FIELD OF THE INVENTION

This invention relates to woodworking tools and more particularly to so-called "spade bits," which are generally used with an electric drill for drilling large diameter holes in wood.

BACKGROUND

Spade bits (sometimes also known as "fly cutters") are widely used for boring holes between approximately ¼" and 1½" diameter in wood and similar soft materials, because they are fast, true cutting, resharpenable, and relatively inexpensive. Their name derives from the shape of the spadelike blade or cutter, in contrast to the spiral shape of augers and twist drills. The blade, which is usually forged integrally from the shank, is relatively thin and flat and may have a width several times the diameter of the shank.

Robinson U.S. Pat. No. 2,782,824, issued Feb. 26, 1957, to the assignee of the present application, shows a bit of this general type, having a flat blade with straight outer sides extending parallel to the axis, shoulders which extend radially inwardly from the outer sides, and a sharp triangular central point which projects from the shoulders along the direction of the axis. The point centers and steadies the blade with respect to the workpiece and prevents it from wandering as it cuts; the shoulders cut the hole to the diameter of the outer sides; and the outer sides serve to stabilize or center the blade when it cuts through the workpiece. The outer sides, shoulders, and point are all slightly beveled along the edges to provide a "positive rake" (i.e., a slightly acute angle, typically about 86°, with the blade surface) for cutting. On each cutting or leading edge of the point (the two diagonally opposite edges in the direction of rotation) a groove or flute is formed which extends back to and somewhat beyond the shoulder, onto the flat face of the blade. These point flutes extend parallel to the cutting edges of the point; one flute is formed on each surface of the point. These flutes are nearly parallel to the axis and assist in the upward removal of chips cut by the point. This enables the point to penetrate and cut the wood with less force and thrust than would otherwise be required.

In use, spade bits of relatively small diameters, approximately ½" or less, penetrate relatively quickly, for a given loading but for blade diameters above approximately ¾", the rate of cutting is markedly slower. Moreover, as the blade emerges from the opposite (or back) side of the workpiece, having cut through it, the centering function of the point is progressively lost and the blade is then guided only by its outer sides. As the blade shoulders emerge on the opposite face of the workpiece, splitting and tearing tend to occur, with increased likelihood of jamming and damage to the tool and the workpiece.

It is known to form a forwardly projecting sharp cutting foot on auger bits, see for example, Kronwall U.S. Pat. No. 2,627,292. However, such forwardly projecting cutting edges require an increase in the thickness of the blade at the cutting edge, which in turn greatly increases cost of auger bits relative to that of a spade-type bit wherein the blade is forged to a uniform thickness.

BRIEF DESCRIPTION OF THE INVENTION

In attempts to improve cutting rate, experiments were made with sharper bevel angles on otherwise conventional spade bits. It was found that the provision of sharper (more acute) cutting edge on the shoulders would increase cutting rate, but also tended to cause the blade to pull itself rapidly into the wood and to cause jamming. Moreover, serious splitting occurred as the blade cut through the workpiece.

In an effort to overcome the problems resulting from use of greater shoulder rake, we have now discovered that the rate and smoothness of cutting are dramatically improved by providing essentially radial flutes on the spade portion of the bit, adjacent and parallel to the cutting edges of the shoulders. These flutes should run essentially perpendicularly to the axis of the bit, and thus perpendicularly (rather than parallel to) the direction of blade movement into the workpiece. These shoulder flutes should intersect the point flutes, and should extend toward but preferably not to the outer sides of the blade; that is, the shoulder flutes should terminate just inward of the outer corners of the shoulders. It is especially preferred that each shoulder flute be stopped or closed by a sharp cutting spur which extends from the outer corner of the shoulder, parallel to the blade axis.

Test have demonstrated that the provision of these shoulder flutes will in some cases more than double cutting rate, but without the splitting or tearing that accompanies use of a sharper shoulder bevel. The reason for their effectiveness is not fully understood, because they expand perpendicularly to the axis of the cutter, that is, transversely rather than parallel to the shank, whereas the movement of the chips is essentially axially or diagonally outward along the shank. In contrast to point flutes, which run parallel to the direction of chip movement and thereby facilitate the flow of movement of chips away from the cutting edge, the shoulder flutes run crosswise and thus might be thought not to assist, or to disrupt rather than facilitate, the flow of chips.

In tests we have found that such shoulder flutes, if extended to the outer sides of the blade, can cause tearing or ripping where the blade emerges from the workpiece; the cutting proceeds by a shearing action which propagates splits outwardly beyond the blade. However, we have found that if the flutes are "stopped", that is, if they do not extend or "open" to the respective outer sides of the blade, and if cutting spurs are provided at the outer corners of the shoulders so that the spurs "close" the flutes, then this splitting is virtually eliminated and cutting proceeds more smoothly, with even less tearing where it cuts through the workpiece than with conventional spade bits of the type shown in the Robinson patent.

Thus, the provision of flutes on the lateral cutting edges of the shoulders does not by itself provide the effect that is obtained by the combined use of shoulder flutes and shoulder spurs. In other words, the combination of the shoulder flutes and the spurs together provides much better results than can be obtained by either alone.

DETAILED DESCRIPTION OF THE INVENTION

Figure 1:
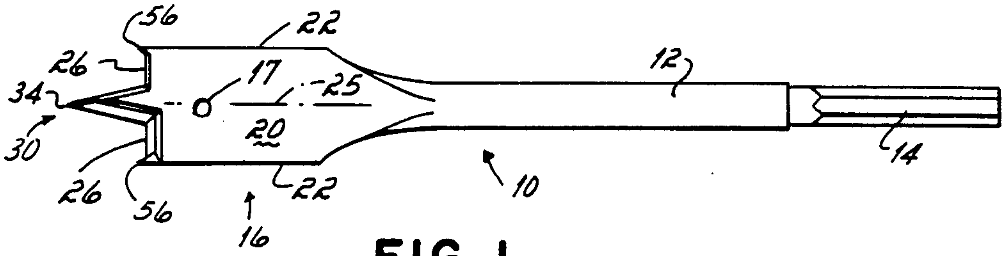
FIG. 1 is a plan view of a bit having shoulder flutes and spurs in accordance with a preferred form of the invention.

The drawings show a spade bit 10 in accordance with a preferred embodiment of the invention, having a generally cylindrical shank 12 with a hexagonal end 14 by which the bit can be gripped in an electric drill. A blade or spade 16 is formed at the opposite end of shank 12. Typically but not necessarily, blade 16 is forged integrally from the same piece as shank 12. Blade 16 is substantially flat with parallel opposite large faces 18 and 20, and is thinner and wider than the shank. The blade may be up to about four times wider than the diameter of the shank.

The blade may contain a hole 17 on the axis, by which it may be hung, as from a nail, for sale or storage.

Figure 3:
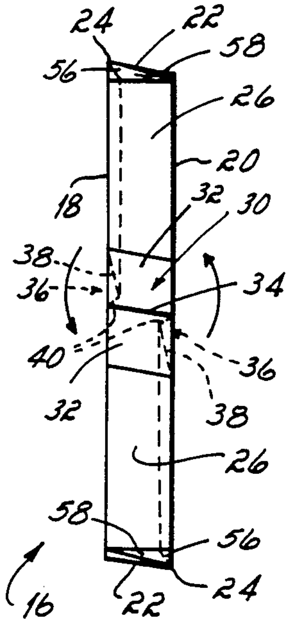
FIG. 3 is an end view of the bit of FIG. 2.

When the shank is rotated at cutting speed, cutting occurs on cutting edges of the forwardly moving faces of the blade. As shown in FIG. 3, the blade is rotated counterclockwise in the direction of the arrows, so that cutting occurs on the left edges of the upper half of blade 16, and on the right edges of the lower half of the blade. The outer sides 22 of the blade are beveled, forming angles of about 86° with the respective blade surfaces 18 and 20, to provide sharp outer cutting edges 24.

Figure 4:
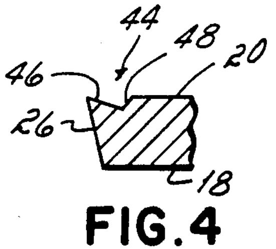
FIG. 4 is an enlarged longitudinal crosssection taken on line 4—4 of FIG. 2.

The blade has radial shoulders 26, 26, which extend inwardly from outer sides 22, toward the axis 25. In practice these shoulders should be perpendicular, or nearly perpendicular, to the axis. The cutting edge of each shoulder is beveled with respect to the plane of the face of the blade, suitably about 86° (see FIG. 4).

A point 30, having converging side edges 32, 32, extends from between shoulders 26. The sides of point 30, meet at a tip 34. The faces of point 30 may be coplanar with the surfaces of the blade, that is, the point is no thicker or thinner than the blade and is not necessarily tapered. It has a sharp tip.

Figure 2:
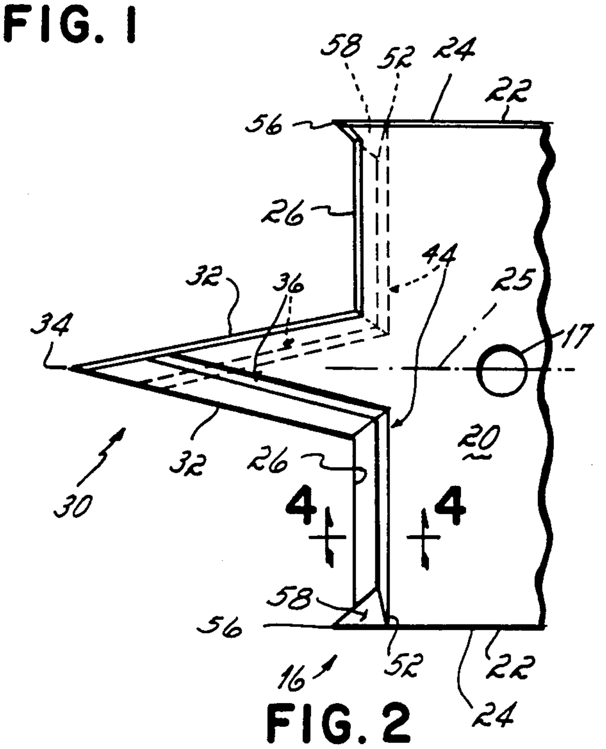
FIG. 2 is an enlarged plan view of the cutting end of the bit.

As shown in the Robinson patent previously referred to, point 30 may have a point flute or groove 36 adjacent each cutting edge thereof, extending parallel to the edge from tip 34 to and slightly beyond the intersection with shoulders 26, 26 (as shown in FIG. 2). These flutes are shown by dotted lines in FIG. 3 and may have a leading or outer surface portion 38 which forms an acute angle with respect to the beveled side 32 of the point. An inward (closer to the axis) point flute surface 40 defines the radially inward side of the flute. Each flute is generally parallel to side 32 of the point, and its outer surface 38 meets and forms a cutting edge with the point side 32. The cross-sectional width of the flute may increase in the direction toward the shoulder; or, as shown in FIG. 2, it may be of uniform width.

In accordance with this invention, a shoulder flute 44 is provided adjacent the cutting edge of each shoulder. This flute preferably has a cross-sectional configuration as shown in section in FIG. 4. This apparently acts to "curl" chips upwardly onto the blade surface. More specifically, the shoulder flute 44 may have an outer portion 46 and an inner surface portion 48. The outer portion joins the leading edge of the shoulder at an acute angle which is less than about 78°, and preferably is about 68° (see FIG. 4). The shoulder flutes join the respective point flutes 36. The leading edge of the shoulder need not project beyond or outwardly of (in the direction of rotation) the plane of blade surface.

It will be noted in FIG. 2 that the shoulder flutes need not, and preferably do not, extend all the way to the outer sides of the blade. The flutes are preferably stopped at ends 52, inwardly of the sides of the blade. We have found it very advantageous to provide a cutting spur 56 which projects parallel to the axis, at the corner or intersection of each shoulder and the respective outer side of the blade. This spur has an outer side which is essentially a continuation of the outer side of the blade. Its inside edge is beveled, as at 58, so that the spur presents a sharp or knife edge which scores and then cuts the workpiece at the periphery of the bore. This helps to hold the blade centered and greatly reduces chipping or tearing.

The flutes and flute ends (both the point flutes and the shoulder flutes) may be formed by milling or griding, but preferably are formed by forging.

Surprising results are obtained by providing shoulder flutes in accordance with the invention; and still greater benefit is obtained by providing both shoulder flutes and spurs in accordance with the preferred embodiment. This is shown by the following comparative tests.

I. Drilling Rate

Bits having both shoulder flutes and spurs in accordance with the preferred embodiment, of various sizes in the range of 9/16" to 11/4" diameter, were tested against bits of the type shown in Robinson U.S. Pat. No. 2,782,824, of the same sizes. The latter bits differed from those of the invention in that they had neither shoulder flutes nor spurs. The bits were compared, in standardized tests on a drill press, by drilling under a constant load into oak.

| Bit Diameter | Bit | Test Duration | Drill rate, in/sec. | Rate Improvement of Invention Over Prior Art |
|---|---|---|---|---|
| 9/16" | Prior Art | 5 sec. | 0.17 | 41% |
| | Invention | 5 sec. | 0.24 | |
| 5/8" | Prior Art | 5 sec. | 0.19 | 16% |
| | Invention | 5 sec. | 0.22 | |
| 7/8" | Prior Art | 15 sec. | 0.16 | 31% |
| | Invention | 12 sec. | 0.21 | |
| 1" | Prior Art | 15 sec. | 0.11 | 109% |
| | Invention | 12 sec. | 0.23 | |
| 1¼" | Prior Art | 15 sec. | 0.07 | 86% |
| | Invention | 15 sec. | 0.13 | |

As can be seen, in each size the new bits bored much faster; the improvement varied but in general increased dramatically with diameter.

II. Effect of Spurs

The combination of the shoulder spurs with shoulder flutes provides advantages over the use of shoulder flutes alone, without spurs. This is shown by the following drilling rate test:

| Size | Bit | Test Duration | Drill Rate, in/sec. | Rate Improvement Over Prior Art |
|---|---|---|---|---|
| 9/16" | Point flutes only | 10 sec. | .22 | |
| | Shoulder flutes | 10 sec. | .24 | 9% |
| | Shoulder flutes | 10 sec. | .27 | 23% |

-continued

| Size | Bit | Test Duration | Drill Rate, in/sec. | Rate Improvement Over Prior Art |
|---|---|---|---|---|
| | and spurs | | | |
| 1" | Point flutes only | 10 sec. | .13 | |
| | Shoulder grooves | 10 sec. | .20 | 54% |
| | Shoulder grooves and spurs | 9 sec. | .30 | 131% |

As can be seen, the combination of the spurs with the shoulder flutes more than doubles the improvement over the prior art use of point flutes alone, and in the larger size the prior art rate is more than doubled.

III. Tear-out

In addition to improving drilling rate, two further advantages are obtained. Where the bit is used to bore all the way through a workpiece, the provision of the spurs produces a clean, crisp exit from the wood, whereas the prior art bit exits from the workpiece with severe splintering and tearing.

IV. Wear Rate

It is especially surprising that the spurs greatly reduce the wear rate of the new bits; the new bits perform substantially longer without "burn out." This is difficult to quantify precisely, but one of the new bits continued to bore effectively after three prior art bits had burnt out and lost their cutting edges.

Having described the invention, what is claimed is:

1. In a spade boring bit of the type comprising a shank; a blade on the shank, said blade having parallel opposite faces with outer sides which are parellel to the axis of the shank; a central point extending axially from said blade; shoulders extending outwardly from said point toward said outer sides; said point having two converging sides leading from said shoulders and meeting at a tip, said point having a point flute adjacent each side thereof, each such point flute extending from the tip of the point to the respective shoulder; the improvement comprising, cutting spurs projecting forwardly from the shoulders, each spur having an outer edge which is a continuation of the outer side of the blade and which is parallel to said axis, and an inner edge which forms a point with the said outer edge of the spur; and a shoulder flute formed in each of said parallel opposite faces of said blade and adjacent the shoulder, each shoulder flute intersecting and extending outwardly in its respective face from the respective point flute perpendicular to the axis of said shank and toward the respective spur, said outer edges of said spurs being sharp, said shoulder flutes terminating at the spurs so that the shoulder flutes do not extend across the spurs to the outer sides of the blades.

2. The improvement of claim 1 wherein each shoulder flute joins and extends from the respective point flute, at substantially a right angle to the axis of the bit.

3. The improvement of claim 1 wherein each shoulder flute has an edge which is an edge of said shoulder.

4. The improvement of claim 1 wherein each shoulder flute forms an acute angle with the respective shoulder, said acute angle being less than about 78°.

5. The improvement of claim 4 wherein said acute angle is about 68°.

6. The improvement of claim 1 wherein said spur is positively raked toward the shoulder flute, the spur having a bevel which slants angularly toward said shoulder flute.

7. The improvment of claim 1 wherein each spur has a bevel which slants into and joins the shoulder flute, the bevels extending between said outer edges and said shoulder flutes, said bevels forming ramps which direct cut workpiece material from the outer edges of the spurs into the shoulder flutes.

8. In a spade bit having a shank; a flat blade at the end of the shank with parallel opposite faces and outer edges which are parallel to the axis of the blade, a central point projecting axially from the blade, the blade having shoulders which project outwardly toward said outer edges on each side of the point, each shoulder having a beveled lateral cutting edge, the improvement comprising, a shoulder flute on each shoulder, said flute extending along the beveled cutting edge of the shoulder, substantially perpendicular to the axis of the shank, each face of said blade having a sharp spur at the respective outer edge of the blade, said spur projecting parallel to said point from the respective shoulder, each said spur having an inward cutting rake which extends into said shoulder flute, the shoulder flute being terminated by the rake of said spur.

9. The improvement of claim 8 further wherein each said shoulder flute is formed as a groove lying between the planes of the faces of the blade.

10. The improvement of claim 8 wherein each said spur is formed within the thickness of said blade.

* * * * *